United States Patent
Ohuchi et al.

(10) Patent No.: US 8,434,362 B2
(45) Date of Patent: May 7, 2013

(54) INERTIAL FORCE SENSOR

(75) Inventors: Satoshi Ohuchi, Hyogo (JP); Hiroyuki Aizawa, Osaka (JP); Jiro Terada, Osaka (JP); Takami Ishida, Osaka (JP); Ichirou Satou, Osaka (JP); Hideo Ohkoshi, Osaka (JP); Yohei Ashimori, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/195,530

(22) Filed: Aug. 1, 2011

(65) Prior Publication Data

US 2011/0283796 A1    Nov. 24, 2011

Related U.S. Application Data

(62) Division of application No. 12/160,237, filed on Jul. 8, 2008.

(30) Foreign Application Priority Data

Jan. 24, 2006 (JP) .................... 2006-014852
Jan. 24, 2006 (JP) .................... 2006-014854
Jan. 24, 2006 (JP) .................... 2006-014856
Jan. 24, 2006 (JP) .................... 2006-014858
Jan. 24, 2006 (JP) .................... 2006-014859

(51) Int. Cl.
     *G01C 19/56*      (2012.01)

(52) U.S. Cl.
     USPC .................. 73/504.04; 73/504.12

(58) Field of Classification Search ........... 73/504.04, 73/504.12, 504.16, 514.36
See application file for complete search history.

(56) References Cited

U.S. PATENT DOCUMENTS

| | | | |
|---|---|---|---|
| 5,998,911 A | 12/1999 | Kikuchi et al. | |
| 6,046,531 A | 4/2000 | Kikuchi et al. | |
| 6,876,134 B2 | 4/2005 | Ikeda et al. | |
| 7,141,912 B2 | 11/2006 | Ikeda et al. | |
| 7,378,778 B2 | 5/2008 | Ikeda et al. | |
| 8,117,913 B2 * | 2/2012 | Terada | ............ 73/504.12 |
| 2001/0001928 A1 | 5/2001 | Kikuchi et al. | |
| 2002/0190612 A1 | 12/2002 | Ikeda et al. | |
| 2005/0127791 A1 | 6/2005 | Ikeda et al. | |
| 2005/0284223 A1 | 12/2005 | Karaki et al. | |
| 2007/0007856 A1 | 1/2007 | Ikeda et al. | |

FOREIGN PATENT DOCUMENTS

| | | |
|---|---|---|
| CN | 1576785 A | 2/2005 |
| JP | 09-329444 A | 12/1997 |
| JP | 11-72333 A | 3/1998 |
| JP | 10-153432 A | 6/1998 |

(Continued)

OTHER PUBLICATIONS

International Search Report Dated Feb. 13, 2007.

(Continued)

*Primary Examiner* — John Chapman, Jr.
(74) *Attorney, Agent, or Firm* — Pearne & Gordon LLP

(57) ABSTRACT

An inertial force sensor includes a detecting device which detects an inertial force, the detecting device having a first orthogonal arm and a supporting portion, the first orthogonal arm having a first arm and a second arm fixed in a substantially orthogonal direction, and the supporting portion supporting the first arm. The second arm has a folding portion. In this configuration, there is provided a small inertial force sensor which realizes detection of a plurality of different inertial forces and detection of inertial forces of a plurality of detection axes.

10 Claims, 12 Drawing Sheets

FOREIGN PATENT DOCUMENTS

| | | | |
|---|---|---|---|
| JP | 10-160478 | A | 6/1998 |
| JP | 11-248465 | A | 9/1999 |
| JP | 11-281372 | A | 10/1999 |
| JP | 2001-074767 | A | 3/2001 |
| JP | 2001-082963 | A | 3/2001 |
| JP | 2001-208546 | A | 8/2001 |
| JP | 2002-022445 | A | 1/2002 |
| JP | 2003-008093 | A | 1/2003 |
| JP | 2005-062160 | A | 3/2005 |
| JP | 2005-098834 | A | 4/2005 |
| JP | 2006-105756 | * | 4/2006 |
| WO | 97-27455 | A1 | 7/1997 |

OTHER PUBLICATIONS

Machine translation of JP 2003-008093, previously submitted on Jul. 8, 2008. Corresponding to US 7,378,778 B2; US 7,141,912 B2; US 6,876,134 B2; US 2007/0007856 A1; US 2005/0127791 A1; US 2002/0190612 A1.

Machine translation of JP 2002-022445 previously submitted on Jul. 8, 2008.

Machine translation of JP 2001-082963 previously submitted on Jul. 8, 2008.

Chinese Office action for application 200780001605.0 dated Sep. 8, 2010.

* cited by examiner

INERTIAL FORCE SENSOR

This application is a division of U.S. patent application Ser. No. 12/160,237 filed Jul. 8, 2008 which is incorporated herein by reference in its entirety.

TECHNICAL FIELD

The present invention relates to an inertial force sensor which detects an inertial force used for various electronic devices, such as a posture controller or a navigation device, of a moving body, such as an airplane, an automobile, a robot, a ship, or a vehicle.

BACKGROUND ART

A conventional inertial force sensor will be described below.

An inertial force sensor which detects an inertial force, such as an angular velocity or acceleration, has been used. In the use of the conventional inertial force sensor, an exclusive angular velocity sensor is used to detect an angular velocity and an exclusive acceleration sensor is used to detect acceleration. When angular velocities and accelerations corresponding to a plurality of detection axes of an X-axis, a Y-axis, and a Z-axis orthogonal to each other are detected, a plurality of angular velocity sensors and a plurality of acceleration sensors according to the number of the detecting axes are used.

When various types of electronic devices combine and detect an angular velocity and acceleration or detect angular velocities and accelerations relative to a plurality of detection axes, a plurality of angular velocity sensors and a plurality of acceleration sensors are mounted on a mounting substrate of the electronic devices.

The angular velocity sensor oscillates a detecting device in tuning fork shape, H shape, or T shape and then electrically detects distortion of the detecting device with occurrence of a Coriolis force to detect an angular velocity. The acceleration sensor has a weight portion and compares and detects movement of the weight portion with acceleration with that before operation to detect acceleration.

Such conventional inertial force sensors, such as the angular velocity sensor and the acceleration sensor, are used for a posture controller or a navigation device of a moving body, such as a vehicle, according to an inertial force or a detection axis to be detected.

The conventional inertial force sensor is disclosed in Unexamined Japanese Patent Publication No. 2001-208546 (Patent Document 1) or Unexamined Japanese Patent Publication No. 2001-74767 (Patent Document 2).

[Patent Document 1] Unexamined Japanese Patent Publication No. 2001-208546

[Patent Document 2] Unexamined Japanese Patent Publication No. 2001-74767

DISCLOSURE OF THE INVENTION

The present invention provides a small inertial force sensor which does not require a large mounting area for mounting a plurality of inertial force sensors and can detect a plurality of different inertial forces, such as an angular velocity and acceleration, or inertial forces of a plurality of detection axes.

An inertial force sensor of the present invention includes a detecting device which detects an inertial force, the detecting device having a first orthogonal structure and a supporting portion, the first orthogonal structure having a support beam and a centrally-supported beam fixed in a substantially orthogonal direction, and the supporting portion supporting the support beam. The centrally-supported beam has a folding portion. With this configuration, there is provided a small inertial force sensor which realizes detection of a plurality of different inertial forces and detection of inertial forces of a plurality of detection axes.

REFERENCE MARKS IN THE DRAWINGS

Figure 1A:
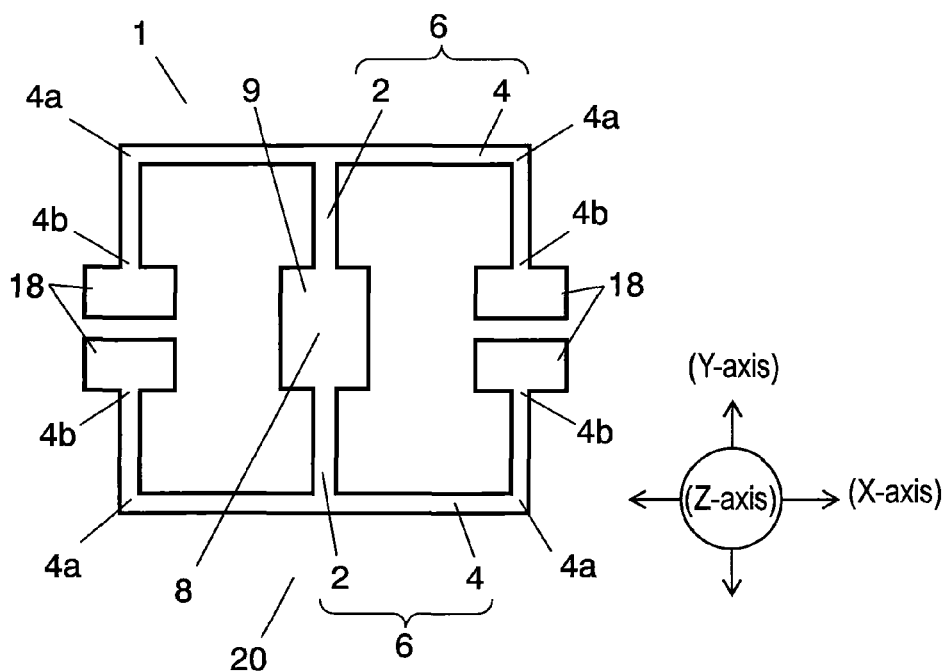
FIG. 1A is a plan view illustrating a detecting device used for an inertial force sensor according to exemplary embodiment 1 of the present invention.

1 Detecting device
2 Support beam
3 Connecting beam
4 Centrally-supported beam
4a Folding portion
4b End
5 Centrally-supported beam
5b End
6 First orthogonal structure
7 Second orthogonal structure
8 Supporting portion
8' Supporting portion
8b' Supporting portion end
9 Base portion
10 Fixing arm
10b End
12 First fixing arm portion
14 Second fixing arm portion
15 Connecting portion
16 Support beam
17 Centrally-supported beam
17a Folding portion
17b End
18 Weight portion
20 Inertial force sensor

DETAILED DESCRIPTION OF THE PREFERRED EMBODIMENTS

Exemplary Embodiment 1

Figure 1B:
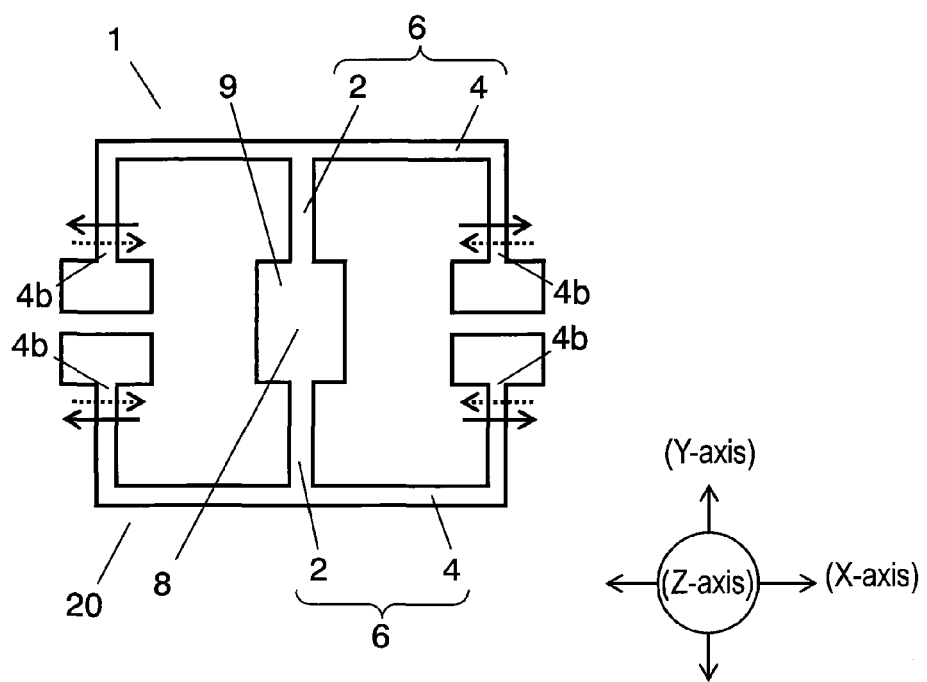
FIG. 1B is an operation state diagram illustrating an operation state of the detecting device illustrated in FIG. 1A.

FIG. 1A is a plan view of a detecting device used for an inertial force sensor according to exemplary embodiment 1 of the present invention. FIG. 1B is an operation state diagram of the detecting device illustrated in FIG. 1A.

In FIG. 1A, inertial force sensor 20 has detecting device 1 which detects an inertial force and a processing circuit (not illustrated). Detecting device 1 has two "T" shaped first orthogonal structures 6 and supporting portion 8. Each of first orthogonal structures 6 has support beam 2 and centrally supported beam 4. Support beam 2 is formed so as to be fixed to centrally-supported beam 4 in a substantially orthogonal direction. Supporting portion 8 supports two support beams 2. Supporting portion 8 serves as base portion 9. When detecting device 1 is mounted on a mounting substrate (not illustrated), detecting device 1 is fixed to the mounting substrate using base portion 9. Centrally-supported beam 4 is folded at folding portions 4a so that ends 4b of centrally-supported beam 4 are arranged to be confronted with each other. Weight portion 18 is formed at end 4b of centrally-supported beam 4.

In detecting device 1, support beam 2 and supporting portion 8 are arranged on a substantially identical straight line. Relative to an X-axis, a Y-axis, and a Z-axis orthogonal to each other, a longitudinal direction of support beam 2 is arranged in the Y-axis direction and a longitudinal direction of centrally-supported beam 4 is arranged in the X-axis direction.

Detecting device 1 is integrally molded to a silicon substrate as a material. A driving electrode is arranged on a structure, which is driven and oscillated, on the silicon substrate. A detecting electrode is arranged on a structure, whose distortion is detected, on the silicon substrate. In detecting device 1 illustrated in FIG. 1A, end 4b of centrally-supported beam 4 is the structure which is driven and oscillated, and support beam 2 and centrally-supported beam 4 are the structure whose distortion is detected. The driving electrode (not illustrated) is arranged on end 4b. The detecting electrodes (not illustrated) are arranged on both of support beam 2 and centrally-supported beam 4.

The driving electrode and the detecting electrode are formed by laminating a lower electrode, a piezoelectric element, and an upper electrode on the silicon substrate. The lower electrode is formed by high-frequency sputtering of Pt, for example. A PZT piezoelectric element is formed on the lower electrode by high-frequency sputtering, for example. The upper electrode is formed on the piezoelectric element by Au deposition, for example.

When an alternating voltage having a resonance frequency which resonates the silicon configuring detecting device 1 is applied between the lower electrode and the upper electrode, the structure on which the driving electrode is arranged is driven and oscillated. The structure is distorted due to an angular velocity and acceleration. A voltage according to the distortion is outputted from the detecting electrode arranged on the distorted structure. The processing circuit detects the angular velocity and the acceleration based on an output voltage outputted from the detecting electrode.

With the above configuration, as for an angular velocity, as illustrated in FIG. 1B, end 4b of centrally-supported beam 4 is driven and oscillated in the X-axis direction, for example. A distortion due to an angular velocity about the Z-axis is caused in the Y-axis direction of centrally-supported beam 4. That is to say, a Coriolis force corresponding to the driving and oscillation is caused in the Y-axis direction of centrally-supported beam 4. At the same time, a distortion due to an angular velocity about the Y-axis is caused in the Z-axis direction of centrally-supported beam 4. Similarly, a Coriolis force corresponding to the driving and oscillation is caused in the Z-axis direction of centrally-supported beam 4. The distortion caused in at least one of the Y-axis direction and the Z-axis direction of centrally-supported beam 4 is detected to detect an angular velocity produced in detecting device 1. The driving and oscillation in the X-axis direction of end 4b are driving and oscillation in which a solid arrow line and a dotted arrow line illustrated in FIG. 1B are repeated alternately, for example.

As for acceleration, as illustrated in FIG. 1B, a distortion due to acceleration in the X-axis direction is caused in support beam 2, similarly. That is to say, a force due to a deadweight of centrally-supported beam 4 is added to support beam 2. At the same time, a distortion due to acceleration in the Y-axis direction is caused in centrally-supported beam 4. That is to say, a force due to the deadweight of centrally-supported beam 4 is added to centrally-supported beam 4. The distortion caused in at least one of support beam 2 and centrally-supported beam 4 is detected to detect acceleration produced in detecting device 1.

Thus, a plurality of different inertial forces added to detecting device 1 is detected. Inertial forces of a plurality of different detection axes added to detecting device 1 are detected. Detecting device 1 which reduces a mounting area and is miniaturized is realized.

In detecting device 1 of the present invention, end 4b of centrally-supported beam 4 is driven and oscillated, and centrally-supported beam 4 has a shape folded at folding portion 4a. Thus, detecting device 1 which has a small mounting area and is miniaturized is realized. In addition, a distance between driven and oscillated end 4b of centrally-supported beam 4 and base portion 9 to which detecting device 1 is fixed becomes substantially longer. Detection sensitivity of the angular velocity and the acceleration in each of the directions is increased. Using miniaturized detecting device 1, a plurality of different angular velocities and accelerations are detected at high sensitivity.

In addition, weight portion 18 is formed at end 4b of centrally-supported beam 4. Detection sensitivity of the acceleration is improved by an effect of a mass of weight portion 18. At the same time, an amplitude of the driving and oscillation of end 4b becomes larger to improve detection sensitivity of the angular velocity. In these effects, a product constant (mass×moving speed) becomes larger by weight portion 18 so that a Coriolis force caused by driving and oscillation is increased.

Figure 2A:
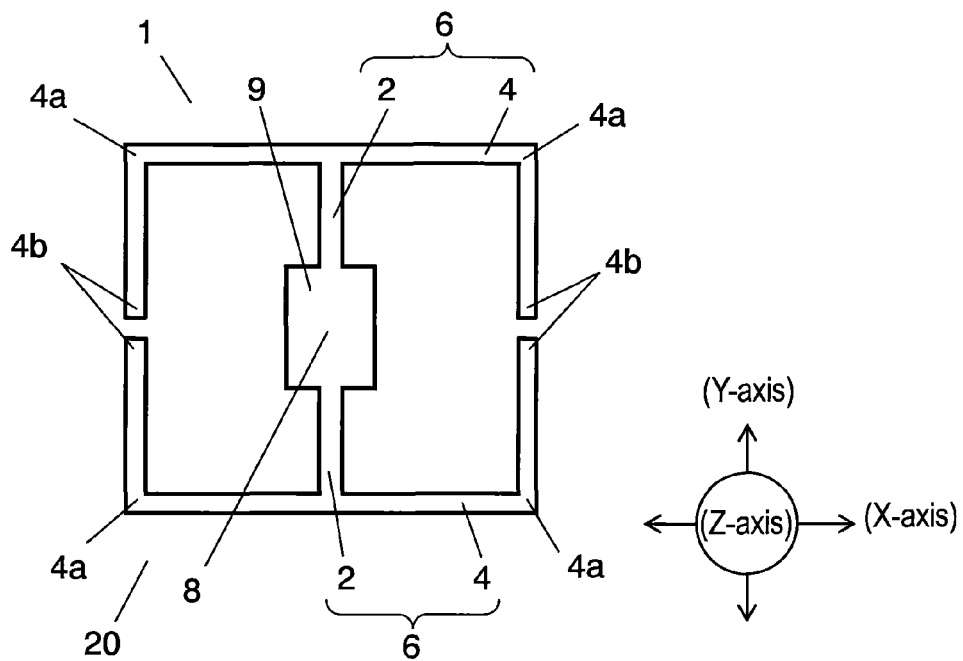
FIG. 2A is a plan view illustrating a detecting device according to another embodiment of exemplary embodiment 1 of the present invention.

Detecting device 1 illustrated in FIG. 1A is formed with weight portion 18. However, weight portion 18 is not always necessary. The effect of the mass of weight portion 18 is exerted by provision of weight portion 18 to improve detection sensitivity of the acceleration and the angular velocity. As illustrated in FIG. 2A, detecting device 1 which does not have weight portion 18 can exert an operation and effect of the present invention. That is to say, in detecting device 1, support beam 2 and centrally-supported beam 4 are fixed in a substantially orthogonal direction so as to form first orthogonal structure 6. Centrally-supported beam 4 is folded at folding portions 4a so that ends 4b are arranged to face together and support beam 2 is placed between ends 4b. With this configuration, a plurality of different angular velocities and accelerations are detected by detecting device 1 having simple configuration.

Figure 2B:
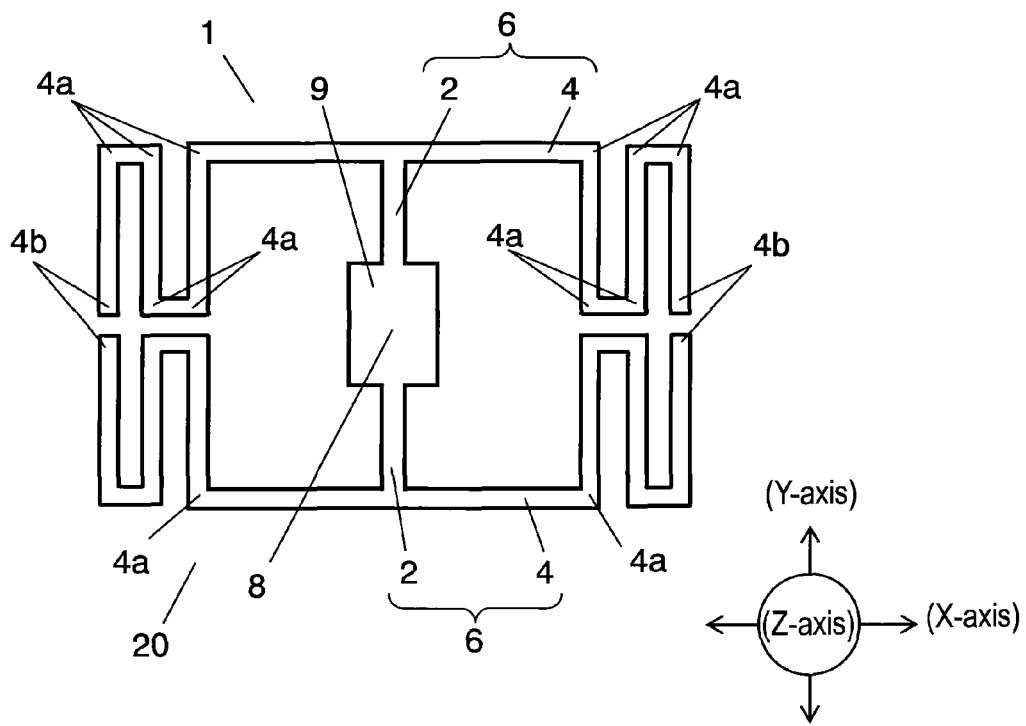
FIG. 2B is a plan view illustrating a detecting device according to a further embodiment of exemplary embodiment 1 of the present invention.

Moreover, centrally-supported beam 4 is folded at a plurality of folding portions 4a so that end 4b may be confronted with centrally-supported beam 4. Furthermore, as illustrated in FIG. 2B, centrally-supported beam 4 is folded at a plurality of folding portions 4a in meander shape so that end 4b may be confront with centrally-supported beam 4. Detecting device 1 is thus configured so that the distance between driven and oscillated end 4b of centrally-supported beam 4 and base portion 9 to which detecting device 1 is fixed becomes substantially longer. The above operation and effect can be improved. Accordingly, detecting device 1 which has a small mounting area, is miniaturized, and has high detection sensitivity is realized.

A position of the driving and oscillation added to detecting device 1 is not always limited to end 4b of centrally-supported beam 4. Other positions of centrally-supported beam 4 or other structures may be driven and oscillated.

Exemplary Embodiment 2

Figure 3:
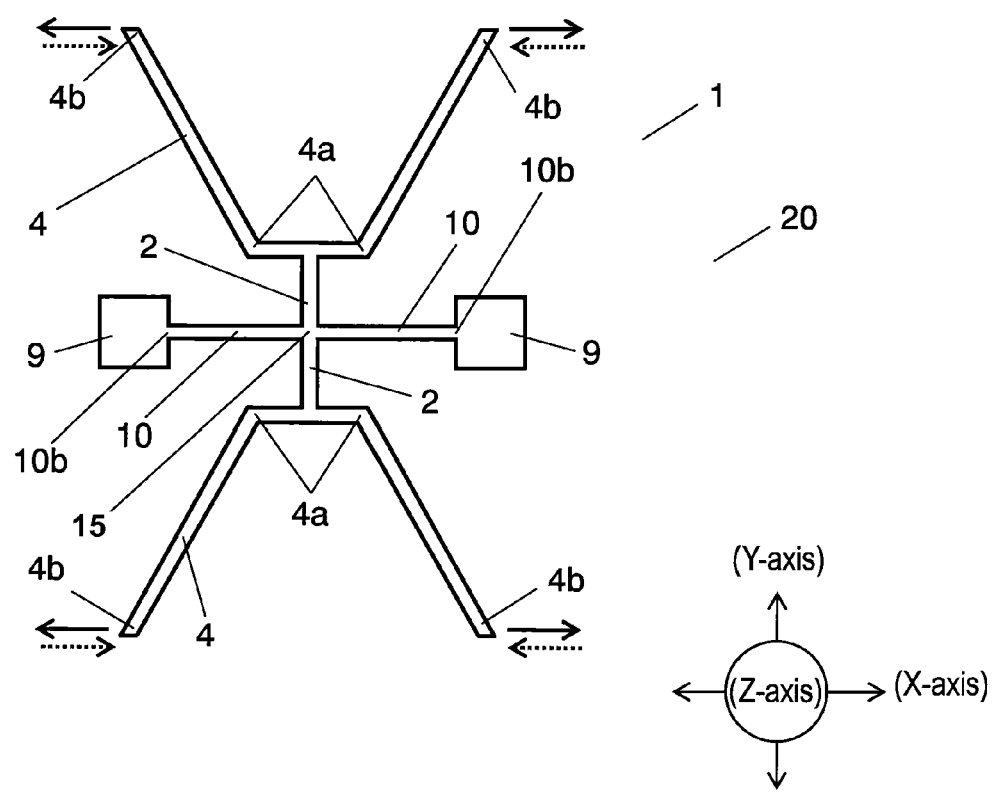
FIG. 3 is an operation state diagram illustrating an operation state of an inertial force sensor according to exemplary embodiment 2 of the present invention.

An inertial force sensor according to exemplary embodiment 2 of the present invention may be of configuration as illustrated in FIG. 3. In the inertial force sensor according to exemplary embodiment 2, the same configuration as that of the inertial force sensor according to exemplary embodiment 1 is indicated by the same reference numerals and the detailed description is omitted.

As illustrated in FIG. 3, in detecting device 1, connecting portion 15 which connects two support beams 2 is fixed to two fixing arms 10. Base portion 9 is formed at end 10b of each of fixing arms 10. Base portion 9 is fixed to a mounting substrate (not illustrated) on which detecting device 1 is mounted. Ends 4b of centrally-supported beam 4 are folded at folding portions 4a so as to be away from fixing arm 10. Although not illustrated, weight portion 18 may be formed at end 4b of centrally-supported beam 4.

In inertial force sensor 20 according to exemplary embodiment 2, as in inertial force sensor 20 according to exemplary embodiment 1, detecting device 1 is integrally molded to a silicon substrate as a material. End 4b of centrally-supported beam 4 is the structure which is driven and oscillated. Support beam 2, centrally-supported beam 4, and fixing arm 10 are the structure whose distortion is detected. Accordingly, a driving electrode (not illustrated) is arranged on end 4b. Detecting electrodes (not illustrated) are arranged on support beam 2, centrally-supported beam 4, and fixing arm 10.

Moreover, as in exemplary embodiment 1, as illustrated in FIG. 3, driving and oscillation in which a solid arrow line and a dotted arrow line are repeated alternately are added in an X-axis direction of end 4b, for example. A distortion due to a Coriolis force corresponding to the driving and oscillation of end 4b is detected to detect an angular velocity.

In detecting device 1 illustrated in FIG. 3, the distortion due to acceleration in a Y-axis direction is caused in fixing arm 10. The distortion caused in fixing arm 10 is detected using the detecting electrode to detect acceleration in the Y-axis direction. Accordingly, as in exemplary embodiment 1, detecting device 1 which reduces a mounting area and is miniaturized is realized.

A position of the driving and oscillation added to detecting device 1 is not always limited to end 4b of centrally-supported beam 4. Other positions of centrally-supported beam 4 or other structures may be driven and oscillated.

Exemplary Embodiment 3

Figure 4A:
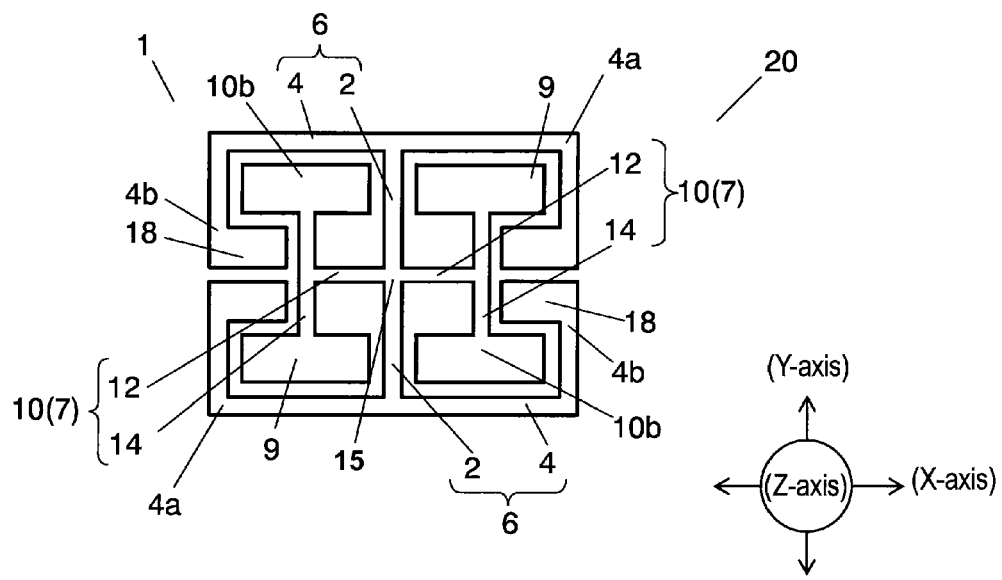
FIG. 4A is a plan view illustrating a detecting device used for an inertial force sensor according to exemplary embodiment 3 of the present invention.
Figure 4B:
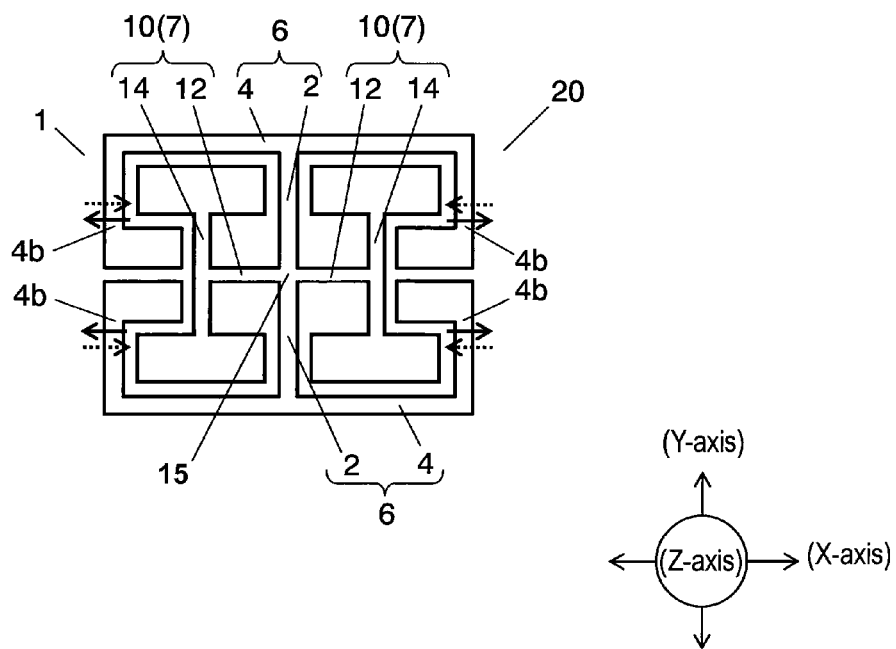
FIG. 4B is an operation state diagram illustrating an operation state of the detecting device illustrated in FIG. 4A.

FIG. 4A is a plan view of a detecting device used for an inertial force sensor according to exemplary embodiment 3 of the present invention. FIG. 4B is an operation state diagram of the detecting device illustrated in FIG. 4A. In the inertial force sensor according to exemplary embodiment 3, the same configuration as that of the inertial force sensor according to exemplary embodiment 1 or 2 is indicated by the same reference numerals and the detailed description is omitted.

In FIG. 4A, inertial force sensor 20 has detecting device 1 which detects an inertial force and a processing circuit (not illustrated). Detecting device 1 has two "T" shaped first orthogonal structures 6, connecting portion 15, and two fixing arms 10. Each of first orthogonal structures 6 has support beam 2 and centrally-supported beam 4. Support beam 2 is formed so as to be fixed to centrally-supported beam 4 in a substantially orthogonal direction. Connecting portion 15 connects two support beams 2. Each of fixing arms 10 has one end fixed to connecting portion 15 and end 10b as the other end formed with base portion 9. Base portion 9 is fixed to a mounting substrate (not illustrated) on which detecting device 1 is mounted. In addition, fixing arm 10 has first fixing arm portion 12 and second fixing arm portion 14. First fixing arm portion 12 is formed so as to be fixed to second fixing arm portion 14 in a substantially orthogonal direction. That is to say, fixing arm 10 configures a "T" shaped second orthogonal structure 7 having first fixing arm portion 12 and second fixing arm portion 14. End 10b of fixing arm 10 formed with base portion 9 is an end of second fixing arm portion 14 or an end of second orthogonal structure 7. Centrally-supported beam 4 is folded at folding portions 4a so that ends 4b of centrally-supported beam 4 are confronted with support beam 2. Support beam 2 and end 4b of centrally-supported beam 4 are arranged to face together and fixing arm 10 is placed between support beam 2 and ends 4b, in appearance. Moreover, centrally-supported beam 4 is folded at folding portions 4a so that ends 4b of centrally-supported beam 4 are confronted with ends 4b of another centrally-supported beam 4.

In detecting device 1, support beam 2 and connecting portion 15 are arranged on a substantially identical straight line. First fixing arm portion 12 and connecting portion 15 are arranged on a substantially identical straight line. Support beam 2 and first fixing arm portion 12 are arranged in a substantially orthogonal direction. Relative to an X-axis, a Y-axis, and a Z-axis orthogonal to each other, a longitudinal direction of support beam 2 and a longitudinal direction of second fixing arm portion 14 are arranged in the Y-axis direction, and a longitudinal direction of centrally-supported beam 4 and a longitudinal direction of first fixing arm portion 12 are arranged in the X-axis direction.

As in exemplary embodiment 1, detecting device 1 is integrally molded to a silicon substrate as a material. In detecting device 1 illustrated in FIG. 4A, end 4b of centrally-supported beam 4 is the structure which is driven and oscillated, and support beam 2, centrally-supported beam 4, first fixing arm portion 12, and second fixing arm portion 14 are the structure whose distortion is detected. Accordingly, a driving electrode (not illustrated) is arranged on end 4b, and detecting electrodes (not illustrated) are arranged on support beam 2, centrally-supported beam 4, first fixing arm portion 12, and second fixing arm portion 14. The detecting electrodes need not be always provided on all of support beam 2, centrally-supported beam 4, first fixing arm portion 12, and second fixing arm portion 14. The detecting electrode should be provided on the structure whose distortion is detected.

With the above configuration, as for an angular velocity, as illustrated in FIG. 4B, when end 4b of centrally-supported beam 4 is driven and oscillated in the X-axis direction, a distortion due to an angular velocity about the Z-axis is caused in the Y-axis direction of centrally-supported beam 4, for example. That is to say, a Coriolis force corresponding to the driving and oscillation is caused in the Y-axis direction of centrally-supported beam 4. At the same time, a distortion due to an angular velocity about the Y-axis is caused in the Z-axis direction of centrally-supported beam 4. That is to say, a Coriolis force corresponding to the driving and oscillation is caused in the Z-axis direction of centrally-supported beam 4. Accordingly, the distortion caused in the Y-axis direction and the Z-axis direction of centrally-supported beam 4 is detected to detect an angular velocity produced in detecting device 1. The driving and oscillation in the X-axis direction of end 4b is driving and oscillation in which a solid arrow line and a dotted arrow line illustrated in FIG. 4B are repeated alternately, for example.

As for acceleration, as illustrated in FIG. 4B, a distortion due to acceleration in the X-axis direction is caused in second fixing arm portion 14, similarly for example. That is to say, forces due to deadweights of support beam 2, centrally-supported beam 4, and first fixing arm portion 12 are added to second fixing arm portion 14. At the same time, distortion due to acceleration in the Y-axis direction is caused in first fixing arm portion 12. That is to say, forces due to deadweights of support beam 2 and centrally-supported beam 4 are added to first fixing arm portion 12. Accordingly, the distortion caused in at least one of first fixing arm portion 12 and second fixing arm portion 14 is detected to detect acceleration produced in detecting device 1.

Thus, a plurality of different inertial forces added to detecting device 1 is detected. Inertial forces of a plurality of different detection axes added to detecting device 1 are detected. Detecting device 1 which reduces a mounting area and is miniaturized is realized.

In detecting device 1 of the present invention, end 4b of centrally-supported beam 4 is driven and oscillated, and centrally-supported beam 4 has a shape folded at folding portion 4a. Thus, detecting device 1 which has a small mounting area and is miniaturized is realized. In addition, a distance between driven and oscillated end 4b of centrally-supported beam 4 and base portion 9 to which detecting device 1 is fixed becomes substantially longer. Detection sensitivity of the angular velocity and the acceleration in each of the directions is increased. Using miniaturized detecting device 1, the angular velocity and the acceleration in each of the directions are detected at high sensitivity. Moreover, detecting device 1 of the present invention has a plurality of different first orthogonal structures 6 and second orthogonal structures 7. Detecting device 1 which has a small mounting area and is excellent in detection sensitivity is realized.

In addition, weight portion 18 is formed at end 4b of centrally-supported beam 4. Detection sensitivity of the acceleration is improved by an effect of a mass of weight portion 18. At the same time, an amplitude of the driving and oscillation of end 4b becomes larger to improve detection sensitivity of the angular velocity. An effect of forming weight portion 18 is similar to that of exemplary embodiment 1.

Figure 5A:
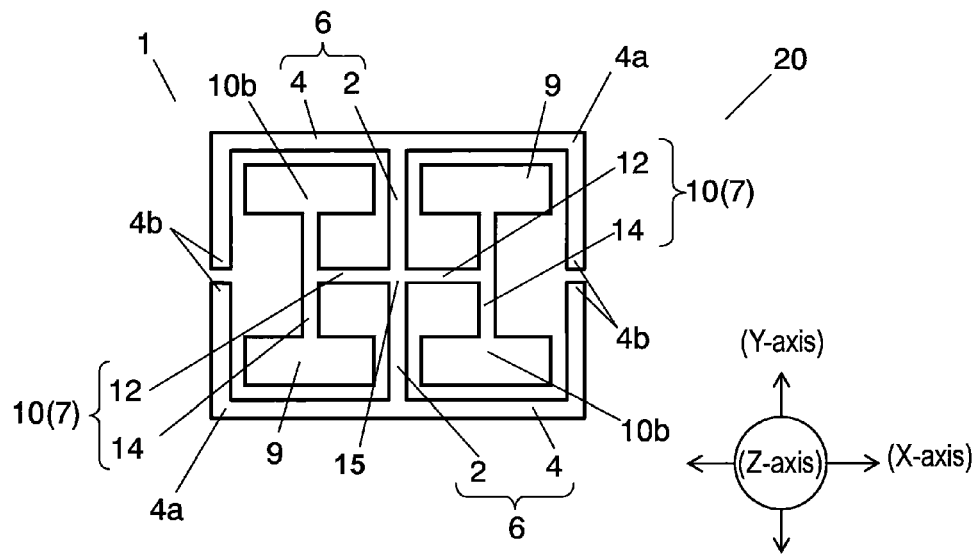
FIG. 5A is a plan view illustrating a detecting device according to another embodiment of exemplary embodiment 3 of the present invention.

Detecting device 1 illustrated in FIG. 4A is formed with weight portion 18. Weight portion 18 is not always necessary. As illustrated in FIG. 5A, detecting device 1 which does not have weight portion 18 can exert an operation and effect of the present invention. That is to say, a plurality of different angular velocities and accelerations are detected at high sensitivity.

Figure 5B:
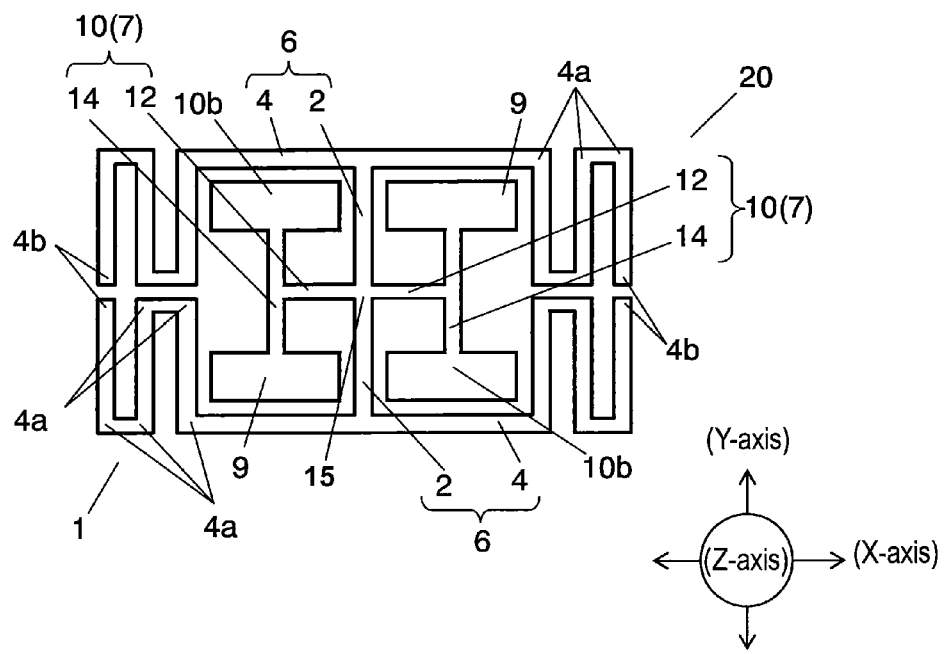
FIG. 5B is a plan view illustrating a detecting device according to a further embodiment of exemplary embodiment 3 of the present invention.

Moreover, centrally-supported beam 4 is folded at a plurality of folding portions 4a so that end 4b may be confronted with centrally-supported beam 4. Furthermore, as illustrated in FIG. 5B, centrally-supported beam 4 is folded at a plurality of folding portions 4a in meander shape so that end 4b may be confronted with centrally-supported beam 4. Detecting device 1 is thus configured to improve the above operation and effect. Accordingly, detecting device 1 which has a small mounting area, is miniaturized, and has high detection sensitivity is realized.

A position of the driving and oscillation added to detecting device 1 is not always limited to end 4b of centrally-supported beam 4. Other positions of centrally-supported beam 4 or other structures may be driven and oscillated.

Exemplary Embodiment 4

Figure 6A:
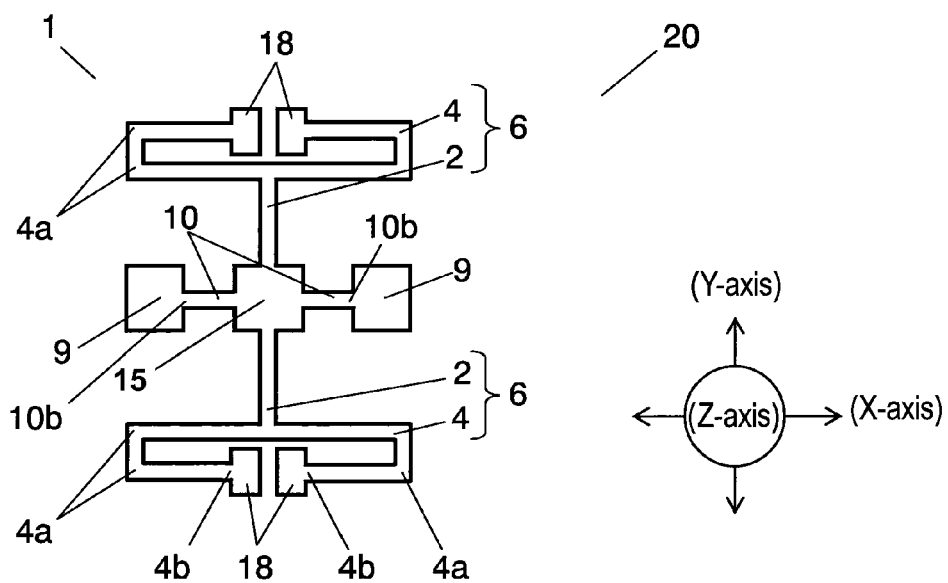
FIG. 6A is a plan view illustrating a detecting device used for an inertial force sensor according to exemplary embodiment 4 of the present invention.
Figure 6B:
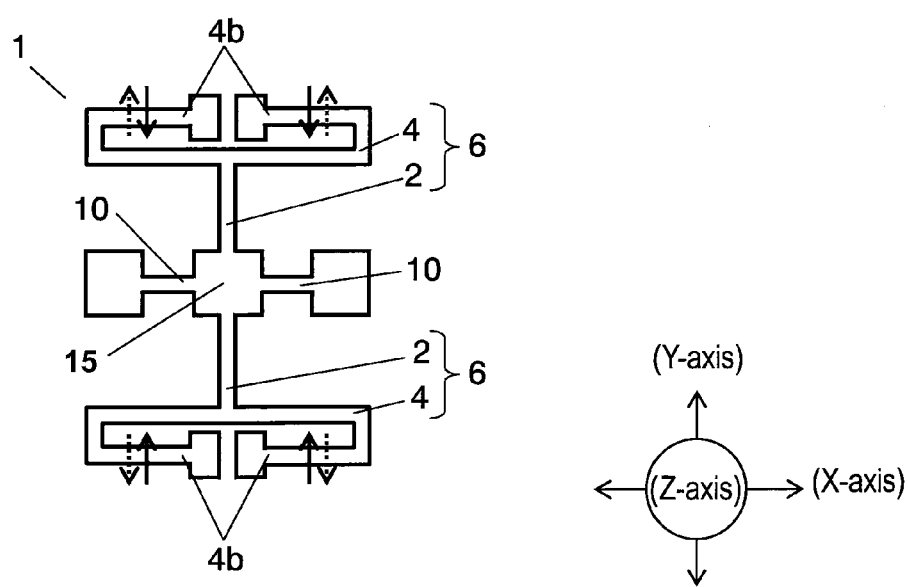
FIG. 6B is an operation state diagram illustrating an operation state of the detecting device illustrated in FIG. 6A.

FIG. 6A is a plan view of a detecting device used for an inertial force sensor according to exemplary embodiment 4 of the present invention. FIG. 6B is an operation state diagram of the detecting device illustrated in FIG. 6A. In the inertial force sensor according to exemplary embodiment 4, the same configuration as that of the inertial force sensors according to exemplary embodiments 1 to 3 is indicated by the same reference numerals and the detailed description is omitted.

In FIG. 6A, inertial force sensor 20 has detecting device 1 which detects an inertial force and a processing circuit (not illustrated). Detecting device 1 has two "T" shaped first orthogonal structures 6, connecting portion 15, and two fixing arms 10. Each of first orthogonal structures 6 has support beam 2 and centrally-supported beam 4. Support beam 2 is formed so as to be fixed to centrally-supported beam 4 in a substantially orthogonal direction. Connecting portion 15 connects two support beams 2. Each of fixing arms 10 has one end fixed to connecting portion 15 and end 10b as the other end formed with base portion 9. Base portion 9 is fixed to a mounting substrate (not illustrated) on which detecting device 1 is mounted. In addition, centrally-supported beam 4 is folded at folding portions 4a so that ends 4b of centrally-supported beam 4 are confronted with centrally-supported beam 4. Weight portion 18 is formed at end 4b of centrally-supported beam 4.

In detecting device 1, support beam 2 and connecting portion 15 are arranged on a substantially identical straight line. Fixing arm 10 and connecting portion 15 are arranged on a substantially identical straight line. Support beam 2 and fixing arm 10 are arranged in a substantially orthogonal direction. Relative to an X-axis, a Y-axis, and a Z-axis orthogonal to each other, a longitudinal direction of support beam 2 is arranged in the Y-axis direction and a longitudinal direction of centrally-supported beam 4 is arranged in the X-axis direction.

As in exemplary embodiment 1, detecting device 1 is integrally molded to a silicon substrate as a material. In detecting device 1 illustrated in FIG. 6A, end 4b of centrally-supported beam 4 is the structure which is driven and oscillated, and support beam 2, centrally-supported beam 4, and fixing arm 10 are the structure whose distortion is detected. A driving electrode (not illustrated) is arranged at end 4b. Detecting electrodes (not illustrated) are arranged on support beam 2, centrally-supported beam 4, and fixing arm 10. The detecting electrodes need not be always provided on all of support beam 2, centrally-supported beam 4, and fixing arm 10. The detecting electrode should be provided on the structure whose distortion is detected.

With the above configuration, as for an angular velocity, as illustrated in FIG. 6B, when end 4b of centrally-supported beam 4 is driven and oscillated in the Y-axis direction, a distortion due to an angular velocity about the Z-axis is caused in the X-axis direction of support beam 2, for example. That is to say, a Coriolis force corresponding to the driving and oscillation is caused in the X-axis direction of centrally-supported beam 4. At the same time, a distortion due to an angular velocity about the X-axis is caused in the Z-axis direction of centrally-supported beam 4. That is to say, a Coriolis force corresponding to the driving and oscillation is caused in the Z-axis direction of centrally-supported beam 4. Accordingly, the distortion caused in the X-axis direction of support beam 2 and the Z-axis direction of centrally-supported beam 4 is detected to detect an angular velocity produced in detecting device 1. The driving and oscillation in the Y-axis direction of end 4b are driving and oscillation in which a solid arrow line and a dotted arrow line illustrated in FIG. 6B are repeated alternately, for example.

As for acceleration, as illustrated in FIG. 6B, a distortion due to acceleration in the X-axis direction is caused in support beam 2, for example. That is to say, a force due to a deadweight of centrally-supported beam 4 is added to support beam 2. At the same time, a distortion due to acceleration in the Y-axis direction is caused in fixing arm 10. That is to say, forces due to deadweights of support beam 2 and centrally-supported beam 4 are added to fixing arm 10. Accordingly, the distortion caused in at least one of support beam 2 and fixing arm 10 is detected to detect acceleration produced in detecting device 1.

Thus, a plurality of different inertial forces added to detecting device 1 is detected. Inertial forces of a plurality of different detection axes added to detecting device 1 are detected. Detecting device 1 which reduces a mounting area and is miniaturized is realized.

In detecting device 1, centrally-supported beams 4 are folded at folding portions 4a so that centrally-supported beams 4 are arranged so as to be confronted with each other. Thus, detecting device 1 which has a small mounting area and is miniaturized is realized. In addition, end 4b of centrally-supported beam 4 is driven and oscillated to detect the distortion of each of the structures. That is to say, detecting device 1 is thus configured so that a distance between driven and oscillated end 4b of centrally-supported beam 4 and base portion 9 to which detecting device 1 is fixed becomes substantially longer. An amplitude of the driving and oscillation of end 4b becomes larger to improve detection sensitivity of the angular velocity. Using miniaturized detecting device 1, a plurality of different angular velocities and accelerations are detected at high sensitivity.

In addition, weight portion 18b is formed at end 4b of centrally-supported beam 4. Detection sensitivity of the acceleration is improved by an effect of a mass of weight portion 18. At the same time, an amplitude of the driving and oscillation of end 4b becomes larger to improve detection sensitivity of the angular velocity. An effect of forming weight portion 18 is similar to that of exemplary embodiment 1.

Figure 7A:
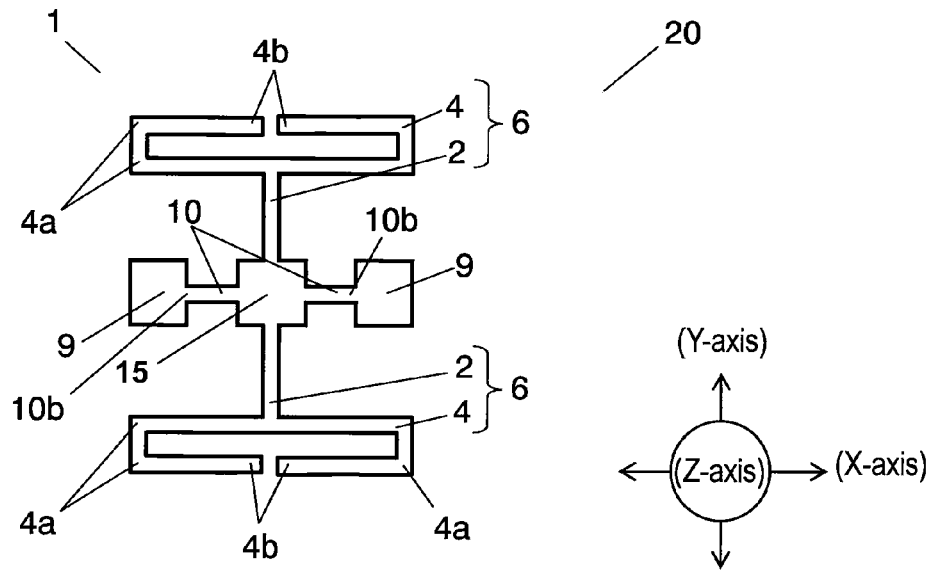
FIG. 7A is a plan view illustrating a detecting device according to another embodiment of exemplary embodiment 4 of the present invention.

Detecting device 1 illustrated in FIG. 6A is formed with weight portion 18. Weight portion 18 is not always necessary. As illustrated in FIG. 7A, detecting device 1 which does not have weight portion 18 can exert an operation and effect of the present invention. That is to say, a plurality of different angular velocities and accelerations are detected at high sensitivity.

Figure 7B:
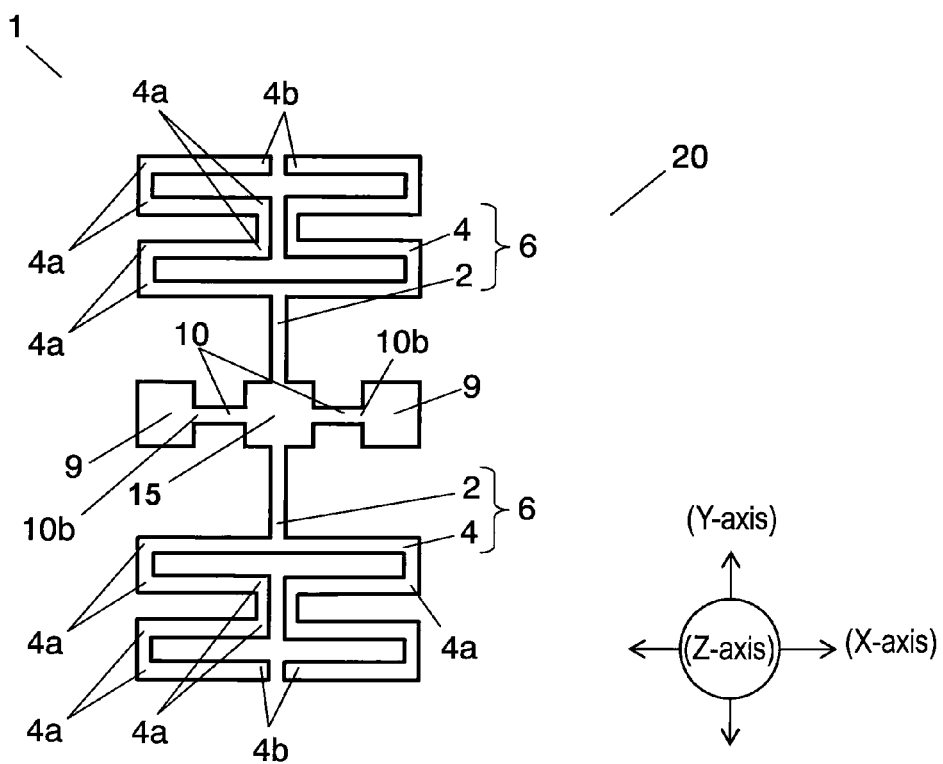
FIG. 7B is a plan view illustrating a detecting device according to a further embodiment of exemplary embodiment 4 of the present invention.

Moreover, centrally-supported beam 4 is folded at a plurality of folding portions 4a so that end 4b may be confronted with centrally-supported beam 4. Furthermore, as illustrated in FIG. 7B, centrally-supported beam 4 is folded at a plurality of folding portions 4a in meander shape so that end 4b may be confronted with centrally-supported beam 4. Detecting device 1 is thus configured to improve detection sensitivity of the angular velocity. Detecting device 1 which has a small mounting area, is miniaturized, and has high detection sensitivity is realized.

A position of the driving and oscillation added to detecting device 1 is not always limited to end 4b of centrally-supported beam 4. Other positions of centrally-supported beam 4 or other structures may be driven and oscillated.

Exemplary Embodiment 5

Figure 8A:
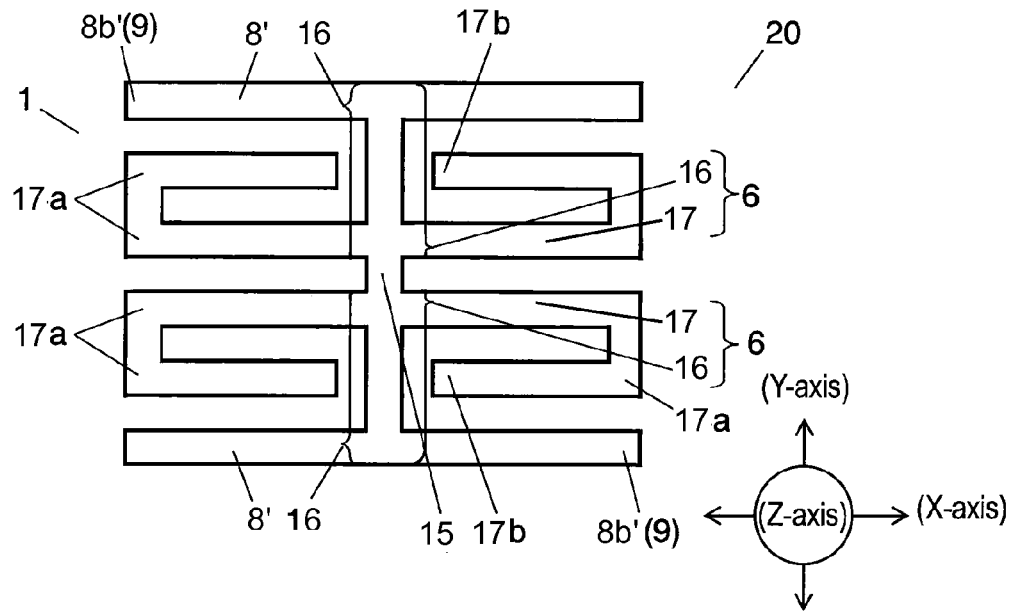
FIG. 8A is a plan view illustrating a detecting device used for an inertial force sensor according to exemplary embodiment 5 of the present invention.
Figure 8B:
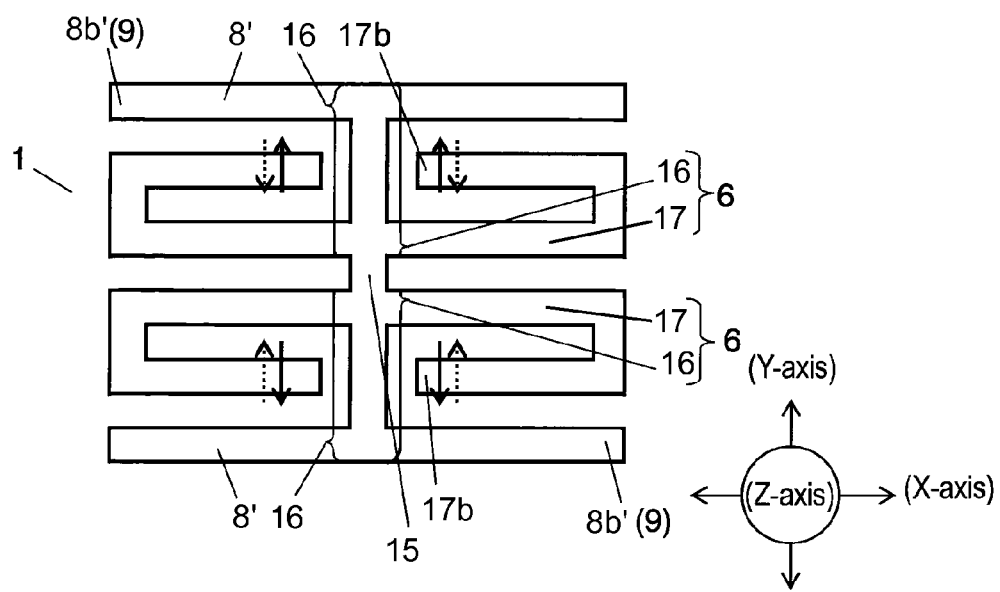
FIG. 8B is an operation state diagram illustrating an operation state of the detecting device illustrated in FIG. 8A.

FIG. 8A is a plan view of a detecting device used for an inertial force sensor according to exemplary embodiment 5 of the present invention. FIG. 8B is an operation state diagram of the detecting device illustrated in FIG. 8A. In the inertial force sensor according to exemplary embodiment 5, the same configuration as that of the inertial force sensors according to exemplary embodiments 1 to 4 is indicated by the same reference numerals and the detailed description is omitted.

In FIG. 8A, inertial force sensor 20 has detecting device 1 which detects an inertial force and a processing circuit (not illustrated). Detecting device 1 has two "T" shaped first orthogonal structures 6, connecting portion 15, and two supporting portions 8'. Each of first orthogonal structures 6 has support beam 16 and centrally-supported beam 17, and each centrally-supported beam 17 includes a pair of beam portions extending from the support beam 16. Support beam 16 is formed so as to be fixed to centrally-supported beam 17 in a substantially orthogonal direction. Connecting portion 15 connects two support beams 16. Each of supporting portions 8' has its middle fixed to support beam 16 and end 8b' formed with base portion 9. Base portion 9 is fixed to a mounting substrate (not illustrated) on which detecting device 1 is mounted. Supporting portion 8' is formed so as to be fixed to support beam 16 of first orthogonal structure 6 in a substantially orthogonal direction. Centrally-supported beam 17 is folded at folding portions 17a so that ends 17b of centrally-supported beam 17 are confronted with support beam 16. Centrally-supported beam 17 is folded at folding portions 17a so that ends 17b of centrally-supported beam 17 are confronted with supporting portion 8'.

In detecting device 1, support beam 16 and connecting portion 15 are arranged on a substantially identical straight line. Relative to an X-axis, a Y-axis, and a Z-axis orthogonal to each other, a longitudinal direction of support beam 16 is arranged in the Y-axis direction, and a longitudinal direction of centrally-supported beam 17 and a longitudinal direction of supporting portion 8' are arranged in the X-axis direction.

As in exemplary embodiment 1, detecting device 1 is integrally molded to a silicon substrate as a material. In detecting device 1 illustrated in FIG. 8A, end 17b of centrally-supported beam 17 is the structure which is driven and oscillated, and support beam 16, centrally-supported beam 17, and supporting portion 8' are the structure whose distortion is detected. A driving electrode (not illustrated) is arranged on end 17b. Detecting electrodes (not illustrated) are arranged on centrally-supported beam 17, support beam 16, and supporting portion 8'. The detecting electrodes need not be always provided on all of centrally-supported beam 17, support beam 16, and supporting portion 8'. The detecting electrode should be provided on the structure whose distortion is detected.

With the above configuration, as for an angular velocity, as illustrated in FIG. 8B, when end 17b of centrally-supported beam 17 is driven and oscillated in the Y-axis direction, a distortion due to an angular velocity about the Z-axis is caused in the X-axis direction of support beam 16, for example. That is to say, a Coriolis force corresponding to the driving and oscillation is caused in the X-axis direction of centrally-supported beam 17. At the same time, a distortion due to an angular velocity about the X-axis is caused in the Z-axis direction of centrally-supported beam 17, support beam portion 16, and supporting portion 8'. That is to say, a Coriolis force corresponding to the driving and oscillation is caused in the Z-axis direction of centrally-supported beam 17, support beam 16, and supporting portion 8'. Accordingly, the distortion caused in the Y-axis direction of centrally-supported beam 17 and the Z-axis direction of at least one of centrally-supported beam 17, support beam portion 16, and supporting portion 8' is detected to detect an angular velocity produced in detecting device 1. The driving and oscillation in the Y-axis direction of end 17b are driving and oscillation in which a solid arrow line and a dotted arrow line illustrated in FIG. 8B are repeated alternately, for example.

As for acceleration, as illustrated in FIG. 8B, a distortion due to acceleration in the X-axis direction is caused in support beam 16, for example. That is to say, a force due to a deadweight of centrally-supported beam 17 is added to support beam 16. At the same time, a distortion due to acceleration in the Y-axis direction is caused in supporting portion 8'. That is to say, forces due to deadweights of centrally-supported beam 17 and support beam 16 are added to supporting portion 8'. Accordingly, the distortion caused in at least one of support beam 16 and supporting portion 8' is detected to detect acceleration produced in detecting device 1.

Thus, a plurality of different inertial forces added to detecting device 1 is detected. Inertial forces of a plurality of different detection axes added to detecting device 1 are detected. Detecting device 1 which reduces a mounting area and is miniaturized is realized.

In detecting device 1, centrally-supported beams 17 are folded at folding portions 17a so that centrally-supported beams 17 are arranged so as to be confronted with each other. Thus, detecting device 1 which has a small mounting area and is miniaturized is realized. In addition, end 17b of centrally-supported beam 17 is driven and oscillated to detect the distortion of each of the structures. That is to say, detecting device 1 is thus configured so that a distance between driven and oscillated end 17b of centrally-supported beam 17 and base portion 9 to which detecting device 1 is fixed becomes substantially longer. An amplitude of the driving and oscillation of end 17b becomes larger to improve detection sensitivity of an angular velocity. Using miniaturized detecting device 1, a plurality of different angular velocities and accelerations are detected at high sensitivity.

Figure 9:
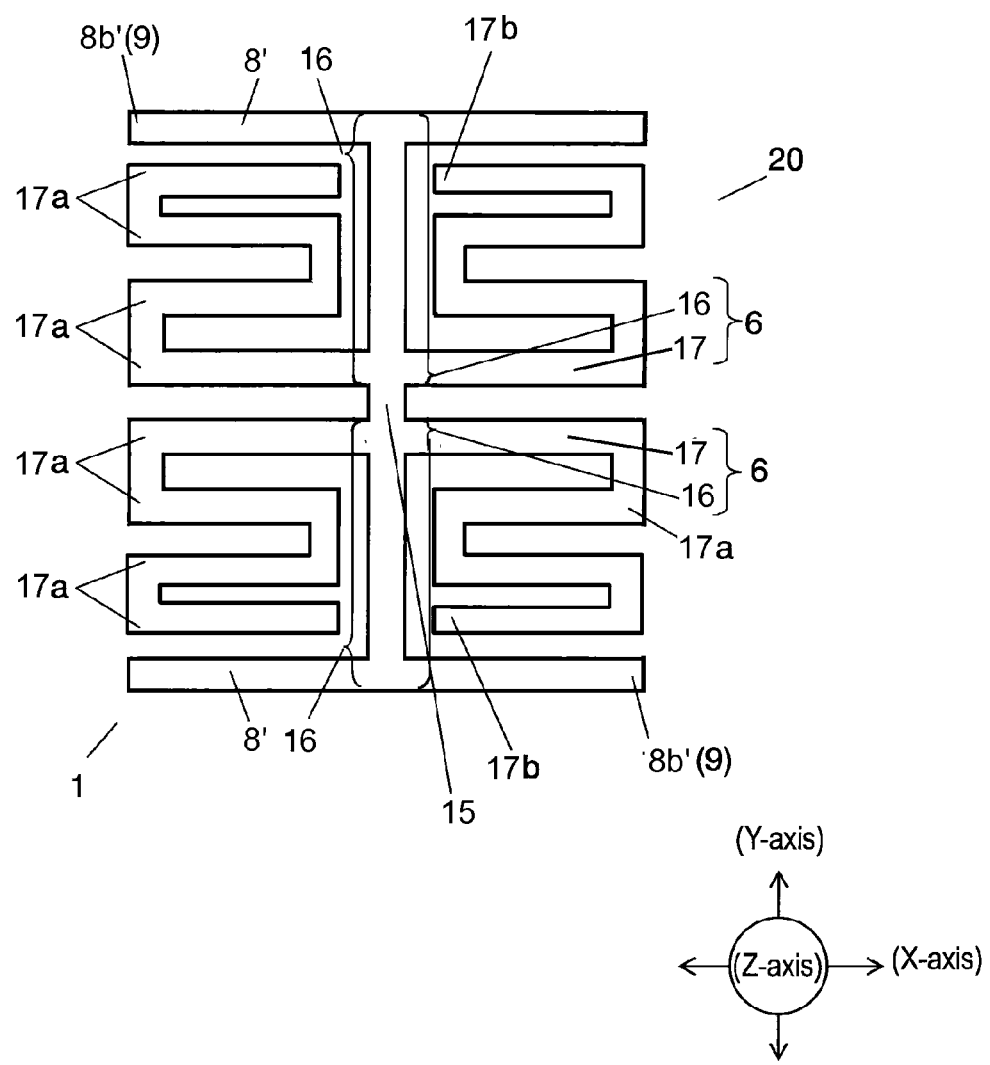
FIG. 9 is a plan view illustrating a detecting device according to another embodiment of exemplary embodiment 5 of the present invention.

Moreover, centrally-supported beam 17 is folded at a plurality of folding portions 17a so that end 17b may be confronted with centrally-supported beam 17. Furthermore, as illustrated in FIG. 9, centrally-supported beam 17 is folded at a plurality of folding portions 17a in meander shape so that end 17b may be confronted with centrally-supported beam 17. Detecting device 1 is thus configured to improve detection sensitivity of the angular velocity. Detecting device 1 which has a small mounting area, is miniaturized, and has high detection sensitivity is realized.

In addition, weight portion 18 (FIG. 10) is formed at end 17b of centrally-supported beam 17. Detection sensitivity of acceleration is improved. An amplitude of the driving and oscillation of end 17b becomes larger to improve detection sensitivity of the angular velocity.

Figure 10:
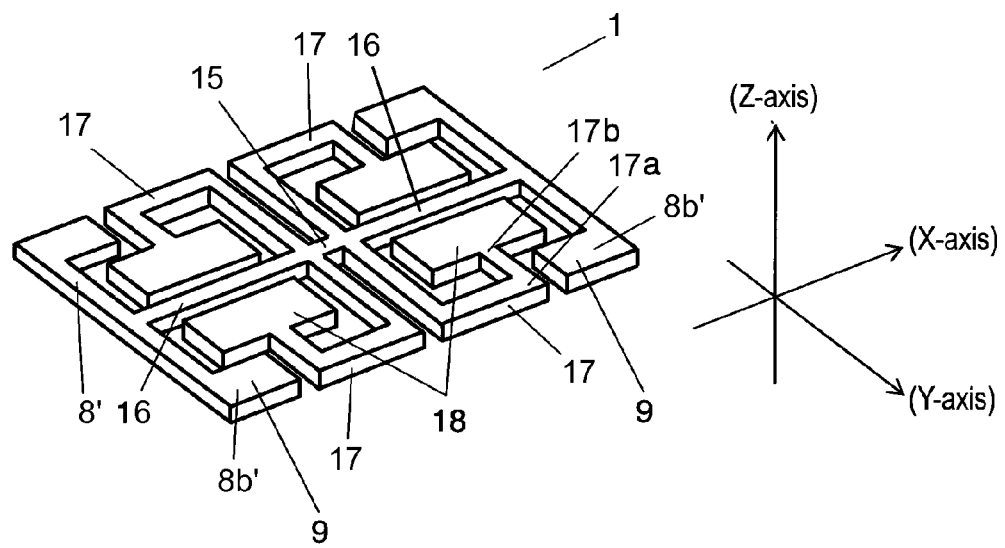
FIG. 10 is a perspective view of a detecting device according to a further embodiment of exemplary embodiment 5 of the present invention.

Accordingly, as illustrated in FIG. 10, when centrally-supported beam 17 is folded at folding portions 17a so that ends 17b are confronted with centrally-supported beam 17 and weight portion 18 is formed at end 17b, detection sensitivity of both the angular velocity and acceleration is improved.

A position of the driving and oscillation added to detecting device 1 is not always limited to end 17b of centrally-supported beam 17. Other positions of centrally-supported beam 17 or other structures may be driven and oscillated.

Exemplary Embodiment 6

Figure 11:
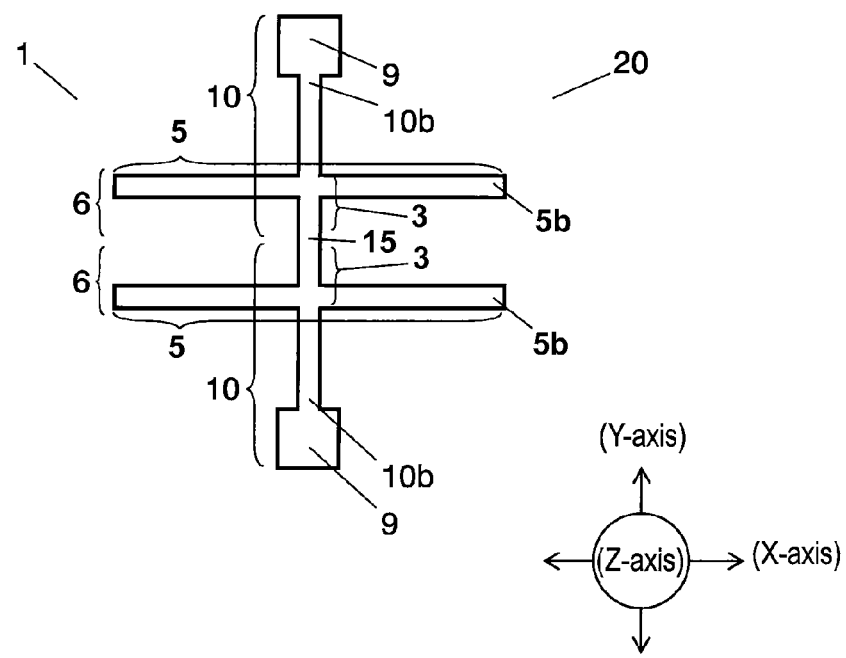
FIG. 11 is a plan view of a detecting device used for an inertial force sensor according to exemplary embodiment 6 of the present invention.
Figure 12:
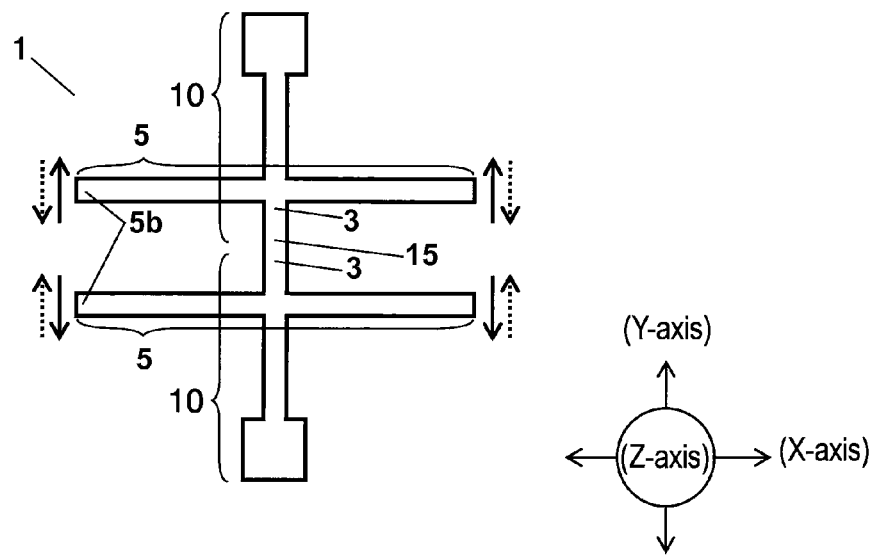
FIG. 12 is an operation state diagram illustrating an operation state of the detecting device illustrated in FIG. 11.

FIG. 11 is a plan view of a detecting device used for an inertial force sensor according to exemplary embodiment 6 of the present invention. FIG. 12 is an operation state diagram of the detecting device illustrated in FIG. 11. In the inertial force sensor according to exemplary embodiment 6, the same configuration as that of the inertial force sensors according to exemplary embodiments 1 to 5 is indicated by the same reference numerals and the detailed description is omitted.

In FIG. 11, inertial force sensor 20 has detecting device 1 which detects an inertial force and a processing circuit (not illustrated). Detecting device 1 has two first orthogonal structures 6, connecting portion 15, and two fixing arms 10. Each of first orthogonal structures 6 has connecting beam 3 and centrally-supported beam 5. Connecting beam 3 is formed so as to be fixed to centrally-supported beam 5 in a substantially orthogonal direction. Connecting portion 15 connects two connecting beams 3. Each of fixing arms 10 has one end fixed to connecting portion 15 and end 10b as the other end formed with base portion 9. Base portion 9 is fixed to a mounting substrate (not illustrated) on which detecting device 1 is mounted. At least a part of fixing arm 10 serves as connecting beam 3.

In detecting device 1, fixing arm 10 and connecting portion 15 are arranged on a substantially identical straight line. In other words, connecting beam 3 and connecting portion 15 are arranged on a substantially identical straight line. Relative to an X-axis, a Y-axis, and a Z-axis orthogonal to each other, a longitudinal direction of connecting beam 3 and a longitudinal direction of fixing arm 10 are arranged in the Y-axis direction, and a longitudinal direction of centrally-supported beam 5 is arranged in the X-axis direction.

As in exemplary embodiment 1, detecting device 1 is integrally molded to a silicon substrate as a material. In detecting device 1 illustrated in FIG. 11, end 5b of centrally-supported beam 5 is the structure which is driven and oscillated, and centrally-supported beam 5 and fixing arm 10 are the structure whose distortion is detected. A driving electrode (not illustrated) is arranged on end 5b. Detecting electrodes (not illustrated) are arranged on centrally-supported beam 5 and fixing arm 10. The detecting electrodes need not be always provided on all of connecting beam 3, centrally-supported beam 5, and fixing arm 10. The detecting electrode should be provided on the structure whose distortion is detected.

With the above configuration, as for an angular velocity, as illustrated in FIG. 12, when end 5b of centrally-supported beam 5 is driven and oscillated in the Y-axis direction, a distortion due to an angular velocity about the Z-axis is caused in the X-axis direction of fixing arm 10, for example. That is to say, a Coriolis force corresponding to the driving and oscillation is caused in the X-axis direction of centrally-supported beam 5. At the same time, a distortion caused in an angular velocity about the X-axis is caused in the Z-axis direction of fixing arm 10 and centrally-supported beam 5. That is to say, a Coriolis force corresponding to the driving and oscillation is caused in the Z-axis direction of centrally-supported beam 5 and fixing arm 10. Accordingly, the distortion caused in the X-axis direction of fixing arm 10 and the Z-axis direction of at least one of centrally-supported beam 5 and fixing arm 10 is detected to detect an angular velocity produced in detecting device 1. The driving and oscillation in the Y-axis direction of end 5b are driving and oscillation in which a solid arrow line and a dotted arrow line illustrated in FIG. 12 are repeated alternately, for example.

As for acceleration, as illustrated in FIG. 12, a distortion due to acceleration in the X-axis direction is caused in fixing arm 10, for example. That is to say, a force due to a deadweight of centrally-supported beam 5 is added to fixing arm 10. At the same time, a distortion due to acceleration in the Y-axis direction is caused in centrally-supported beam 5. A force due to a deadweight of centrally-supported beam 5 is added to centrally-supported beam 5. Accordingly, the distortion caused in at least one of fixing arm 10 and centrally-supported beam 5 is detected to detect acceleration produced in detecting device 1.

Thus, a plurality of different inertial forces added to detecting device 1 is detected. Inertial forces of a plurality of different detection axes added to detecting device 1 are detected. Detecting device 1 which reduces a mounting area and is miniaturized is realized.

Figure 13:
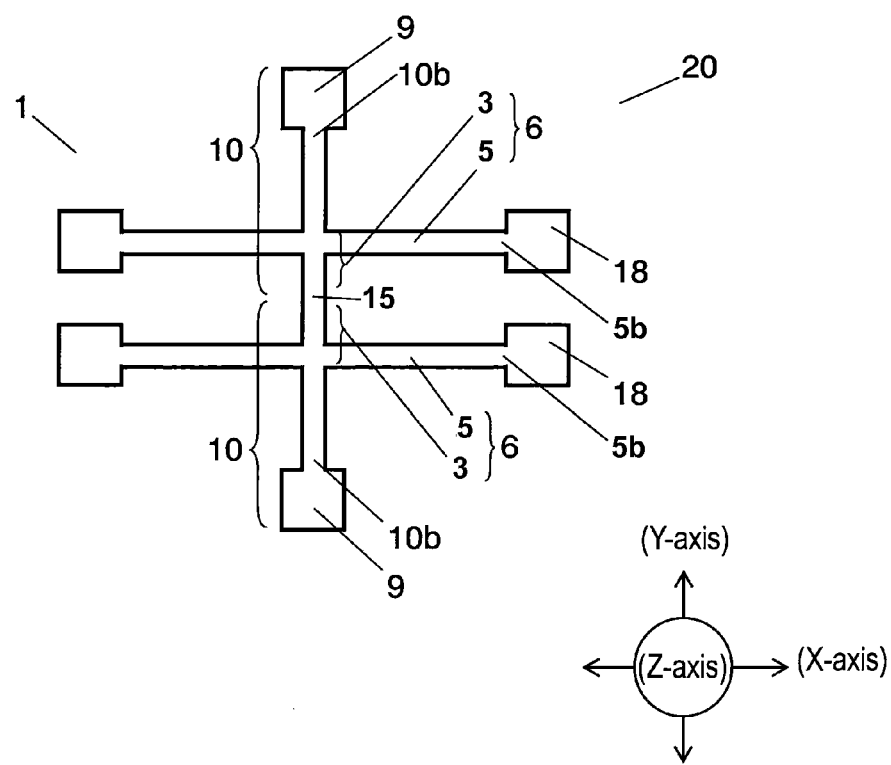
FIG. 13 is a plan view of a detecting device according to another embodiment of exemplary embodiment 6 of the present invention.

In addition, as illustrated in FIG. 13, weight portion 18 is formed at end 5b of centrally-supported beam 5. Detection sensitivity of acceleration is improved. An amplitude of the driving and oscillation of end 5b becomes larger to improve detection sensitivity of the angular velocity.

Figure 14A:
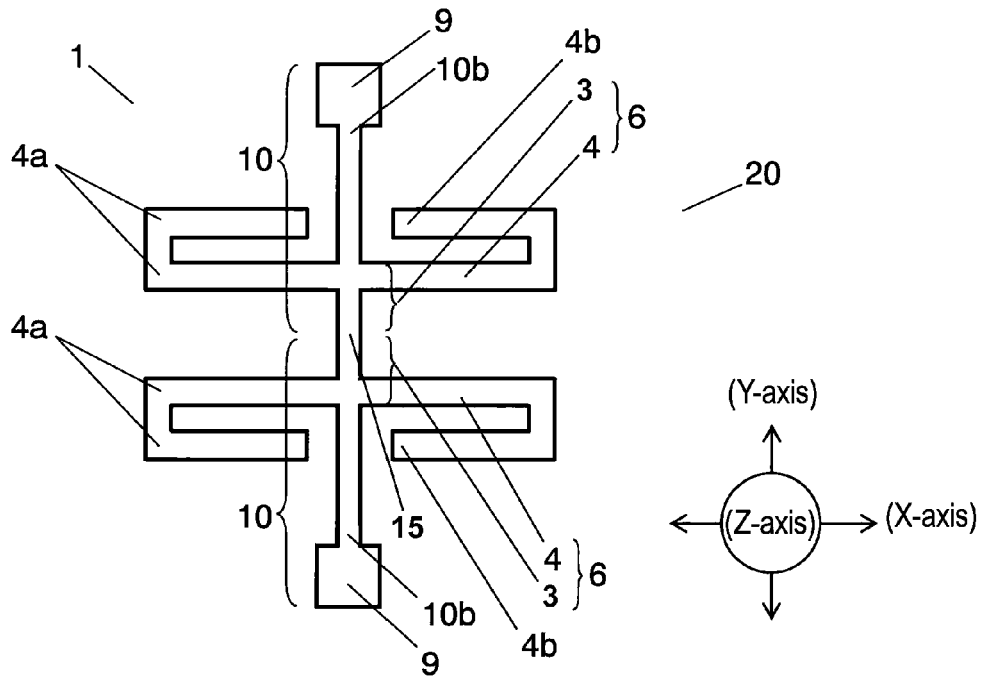
FIG. 14A is a plan view of a detecting device according to a further embodiment of exemplary embodiment 6 of the present invention.
Figure 14B:
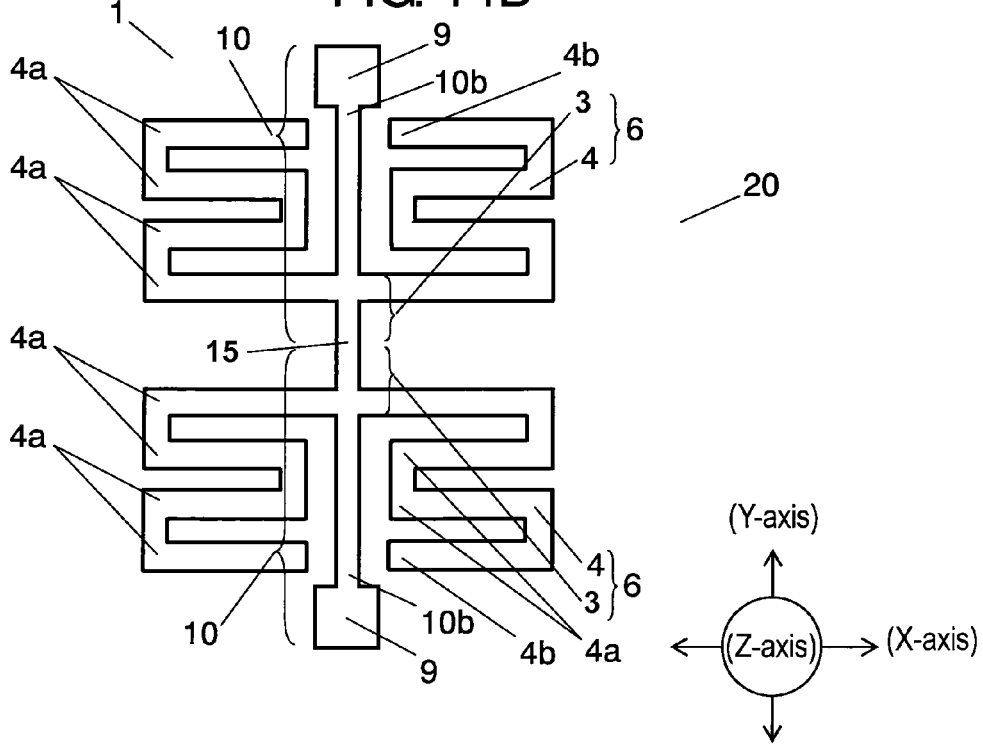
FIG. 14B is a plan view of a detecting device according to a still another embodiment of exemplary embodiment 6 of the present invention.

Moreover, as illustrated in FIG. 14A, centrally-supported beam 4 is folded at a plurality of folding portions 4a so that end 4b may be confronted with centrally-supported beam 4. Furthermore, as illustrated in FIG. 14B, centrally-supported beam 4 is folded at a plurality of folding portions 4a in meander shape so that end 4b may be confronted with centrally-supported beam 4. Detecting device 1 is thus configured so that an amplitude of the driving and oscillation of end 4b becomes larger to improve detection sensitivity of the angular velocity. Detecting device 1 which has a small mounting area, is miniaturized, and has high detection sensitivity is realized.

A position of the driving and oscillation added to detecting device 1 is not always limited to end 4b of centrally-supported beam 4. Other positions of centrally-supported beam 4 or other structures may be driven and oscillated.

INDUSTRIAL APPLICABILITY

The inertial force sensor according to the present invention can detect a plurality of inertial forces and inertial forces of a plurality of detection axes and is applicable to various electronic devices.

The invention claimed is:

1. An inertial force sensor comprising:
a detecting device which detects an inertial force,
wherein the detecting device includes:
  two first beams, and
  two second beams each comprising a pair of beam portions extending from one of the first beams, wherein:
  an X-axis, a Y-axis, and a Z-axis are orthogonal to each other,
  each end of said two second beams has at least one folding portion,
  the two first beams are arranged on a substantially identical straight line,
  a longitudinal direction of the two first beams are arranged in the Y-axis direction,
  a longitudinal direction of the two second beams are arranged in the X-axis direction, and
  each end of the two second beams are capable of being driven and oscillated in the Y-axis direction, such that: an angular velocity about the Z-axis is detected by detecting distortion of the detecting device in the X-axis direction, and an angular velocity about the X-axis is detected by detecting distortion of the detecting device in the Z-axis direction.

2. The inertial force sensor according to claim 1, wherein each end of the two second beams are driven and oscillated at the same phase.

3. The inertial force sensor according to claim 1, wherein acceleration is detected by detecting distortion of the detecting device.

4. The inertial force sensor according to claim 1, wherein the detecting device further includes a weight portion formed at each end of the second beams.

5. The inertial force sensor according to claim 1, wherein each end of the second beams are folded in meander shape.

6. The inertial force sensor according to claim 1, wherein the detecting device further includes:
a connecting portion that connects a first end of each of the two first beams; and
two fixing arms each of which is fixed to a second end the two first beams and fixed to a mounting substrate on which the detecting device is to be mounted.

7. An inertial force sensor comprising
a detecting device which detects an inertial force,
wherein the detecting device includes:
- two first beams, and
- two second beams each comprising a pair of beam portions extending from one of the first beams, wherein:
- an X-axis, a Y-axis, and a Z-axis are orthogonal to each other,
- the two first beams are arranged on a substantially identical straight line,
- a longitudinal direction of the two first beams are arranged in the Y-axis direction,
- a longitudinal direction of the two second beams are arranged in the X-axis direction,
- each end of the two second beams are capable of being driven and oscillated in the Y-axis direction, such that an angular velocity about the Z-axis is detected by detecting distortion of the detecting device in the X-axis direction, and an angular velocity about the X-axis is detected by detecting distortion of the detecting device in the Z-axis direction, and
- two fixing arms which are fixed to the two first beams and fixed to a mounting substrate on which the detecting device is to be mounted.

8. The inertial force sensor according to claim 7, wherein the detecting device further includes a connecting portion that connects a first end of each of the two first beams, and wherein the two fixing arms are each fixed to a second end the two first beams.

9. An inertial force sensor comprising,
a detecting device which detects an inertial force,
wherein the detecting device includes:
- two first beams, and
- two second beams each comprising a pair of beam portions extending from one of the first beams, wherein:
- an X-axis, a Y-axis, and a Z-axis are orthogonal to each other,
- the two first beams are arranged on a substantially identical straight line,
- a longitudinal direction of the two first beams are arranged in the Y-axis direction,
- a longitudinal direction of the two second beams are arranged in the X-axis direction,
wherein each end of the two second beams are capable of being driven and oscillated in the Y-axis direction, such that an angular velocity about the Z-axis is detected by detecting distortion of the detecting device in the X-axis direction, and an angular velocity about the X-axis is detected by detecting distortion of the detecting device in the Z-axis direction,
wherein the two second beams have at least one folding portion, and
wherein the detecting device further includes two fixing arms which are fixed to the two first beams and fixed to a mounting substrate on which the detecting device is to be mounted.

10. The inertial force sensor according to claim 9, wherein the detecting device further includes a connecting portion that connects a first end of each of the two first beams, and wherein the two fixing arms are each fixed to a second end the two first beams.

* * * * *